July 29, 1969
C. S. BATCHELOR ET AL
FLAME SPRAY METALLIZING
Original Filed Oct. 2, 1963
Re. 26,634
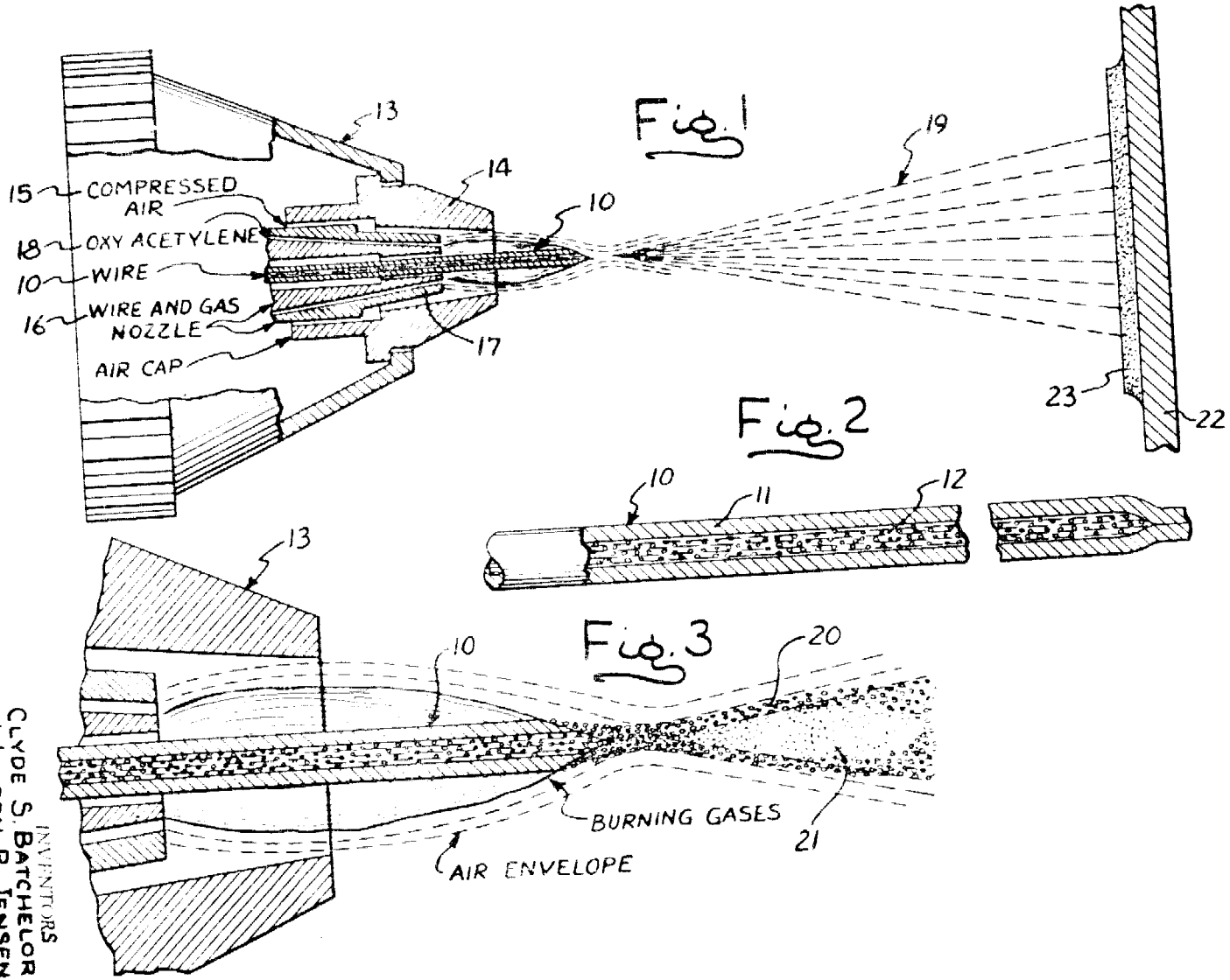
INVENTORS
CLYDE S. BATCHELOR
WARREN R. JENSEN
BY
Gary, Parker, Juettner & Cullinan
ATTYS.

United States Patent Office

Re. 26,634
Reissued July 29, 1969

26,634
FLAME SPRAY METALLIZING

Clyde S. Batchelor Trumbull, and Warren R. Jensen, Stratford, Conn., by Avco Corp., Westboro, Mass, a corporation of Delaware, assignee Original No. 3,342,626, dated Sept. 19, 1967, Ser. No. 313,355, Oct. 2, 1963. Application for reissue Aug. 5, 1968, Ser. No. 764,352
Int. Cl. B05b 7/20; B44d 1/097; C23c 7/00
U.S. Cl. 117—105 8 Claims

Matter enclosed in heavy brackets [ ] appears in the original patent but forms no part of this reissue specification; matter printed in italics indicates the additions made by reissue.

*ABSTRACT OF THE DISCLOSURE*

*Flame spray coatings are applied by use of a flame spray wire composed of a metallic tube filled with a thixotropic suspending medium and discrete particles of ceramic oxide and carbide modifying material.*

This invention relates to the flame spraying of substrates with metallic coatings, to the novel method and means for accomplishing the same and to the novel products resulting therefrom.

More particularly, the present invention relates to the flame spraying of a substrate which may be a planar, angular or curvilinear base of heat-resistant character such as bodies of metallic, ceramic or mineral-fiber character, with a coating of metal of a new and improved character, and it is an object of the present invention to provide metal coatings of the character aforesaid having inclusions of discrete particles of inorganic modifying material dispersed therein.

In general, the objects of the present invention are accomplished by providing novel composite flame spraying wire composed of a solid metal tube having disposed therein discrete particles of inorganic modifying material dispersed in a suspending medium substantially filling the confines of said tube, the said suspending medium being disintegrable under flame spraying conditions and concomitantly aiding in providing a barrier against substantial disintegration of said inorganic material or substantial alloying thereof with the tube metal.

The composite flame spraying wire of the present invention is adapted to be sprayed by conventional spray guns at a temperature and at a rate to atomize at least the solid metal tube and to mechanically trap the modifying particle material inclusion without appreciable alloying of the solid metal component of the wire with the aforesaid modifying filler particle material or appreciable degradation of the latter.

It is presently known to employ flame spraying techniques and to provide composite deposits of materials such as, for example, ceramics and metallic materials by separately flame spraying the metal from a solid wire with the conventional wire flame spray or metallizing gun, and at the same time spraying the ceramic particle material from a different point and at an angle to the flame sprayed from a powder gun. In such operation the metal and the separately sprayed particle material are projected adjacent to each other and not in admixtures except possibly in the overlapping areas of the sprayed cones resulting from the flame spraying technique.

As distinguished from the prior practices and when employing the composite flame spraying wire of the present invention, greater efficiencies are obtained, that is, loss of sprayed metal and particularly loss of the modifying material, is materially reduced and more uniform mixtures are obtained. Employment of the present composite tubes is particularly advantageous when employing particle material such as ceramics or graphite of lower gravity or finely divided particles of any gravity within the metal tube and which normally tend to disperse on spraying.

In the present case with the spray having a surrounding coating or conical zone of metallic particles resulting from the metal tube of the composite wire, and wherein the modifying particles disposed within the tube tends to be retained within said zone and adjacent the axis of the spray, their application onto the sprayed surface tends to be more confined, with the lesser volume of filler particles tending to become overlayed with the metal of the tube. Thus with the employment of the composite flame spraying wire of the present invention better and truer mixtures are obtained in an easy and more positive manner as distinguished from layers, since even when spraying two materials simultaneously at an angle to each other it is difficult to have both meet, and one component tends to blow the other away, resulting in wastage. This is distinguished from the practice of the present invention in which use of the composite wire provides an enveloping and trap-like spray of metal formed from the tube around the sprayed particle material resulting from that disposed within the hollow of the composite flame spraying wire of the present invention.

Moreover, employment of conventional spray guns can be operated at a controlled feed rate and temperature such as to melt and atomize the metal tube, the flame and feed rate being regulated so as to be insufficient to appreciably degrade the contained modifying particle materials or to substantially alloy them with or dissolve them in the metal of the tube.

The provision of the composite flame spraying wire of the present invention, wherein the enveloping tube is composed of solid metal is particularly conducive to the production of densified deposits as distinguished from the relatively porous character of the deposits resulting from the flame spraying of solid metal tubes. This is believed to result from the fact that the heat generated at the nozzle of the spray gun goes through the wall of the tube rapidly as distinguished from the requirement to travel through a solid rod, and results in a more uniform distribution of the heat into and through the metal tube. Moreover, this metal which is atomized and propelled by gas under pressure at substantially the same time that it is melted, due to its having been uniformly heated, apparently has a more plastic flow when the particles thereof land on the substrate enabling these sprayed particles to become deposited in a dense, even, though mechanically interlocked, mass of particles and to provide better anchoring and interlock of the contained modifying particle material which is simultaneously deposited. In the flame spraying operation, the composite tube of the present invention is caused to protrude roughly about ¼ inch beyond the nozzle. This initially shields the fillers except those in actual physical contact with the tube. The fillers near the center of the tube are protected initially by the suspending medium from rapid heating. After the tube has melted away the fillers and the suspending material are subjected to heat but for extremely short periods of time. This is adequate to rapidly disintegrate the carrier or suspending medium for the modifying particles material and to melt or plasticize an appreciable portion of the filler particle materials which are susceptible to melting or plasticization at the temperature of the generated heat or flame of the spray gun consistent with insulation thereof by the tube per se and the insulating effect of the suspending medium, as well as the effect of vaporization or heat disintegration of the latter.

The tube component of the composite wire of the present invention may be composed of metal such as principally of copper, aluminum, or iron, the latter including steel. The inorganic filler particles are selected principally to reinforce or otherwise modify the tube metal by providing a sprayed composite deposit of the metals with improved properties such as improved real or apparent hardness, improved wearing characteristics and corrosion resistance. In such instances the fillers are generally of higher melting point and greater hardness than the metal tube although the inorganic fillers may in other instances be of lubricating character used either alone or in combination with the relatively hard fillers when it is desired to provide lubricating properties. In general the fillers are such that under the flame spraying conditions they do not substantially dissolve in or alloy with the tube metal nor become substantially degraded.

Moreover, the tube metal should generally comprise at least 50% and preferably 60% and upwards of the volume of the sprayed deposit so that the deposit is essentially composed of a matrix of the metal of the tube with modifying inclusions of the filler material.

The term "inorganic" as employed herein with reference to the filler materials will be understood to include broadly natural or synthetic minerals as well as metals and their alloys, and thus although the aforesaid relatively hard, high melting particle material inclusion can be refractory oxide particles such as alumina, zirconia, titania, beryllia, and the like, other particles such as a feldspar, mullite, tungsten carbide, silicon carbide and the like can also be employed. Likewise, particles of metal may also be employed such as nickel, chilled iron, steel, cobalt and the like.

Others which can be used either alone or in combination with the foregoing to serve as lubricants or friction modifying agents and the like are graphite, lead, molybdenum disulphide, Babbitt metals, lead-tin solders, and the like.

Other types of inorganic particles may be of composite character such as zinc, aluminum, copper and the like coated particles of graphite to serve to prevent oxidation of the graphite.

These inorganic particle materials are generally employed in sizes of from about 40 to about 600 mesh. Larger than 40 mesh causes particles to bounce away in spraying resulting in poor efficiency and undesirable porosity. Particles of smaller than about 600 mesh such as those of colloidal size while useful in some instances are generally undesirable in that they cause loss of efficiency and degradation in flame spraying.

However, the use of composite tubes with fillers of the character aforesaid in flame spraying permits the inclusion of metals and other inorganics that would normally alloy or decompose but because of the short time the filler material is exposed to the flame a minimum amount of alloying or degradation takes place.

The substrates may be components of friction mating surfaces such as flywheels, pressure plates, brake drums, vented and unvented brake discs, brake drums for band brakes and the like, which may be composed of ferrous materials such as iron or steel, copper, aluminum, or in the case of such materials as brake bands the substrate may be felted or woven fibrous asbestos.

These friction material substrates, in accordance with the present invention, are preferably sprayed with composite flame spraying wire of the present invention to provide friction material overlays composed principally of copper such as copper of 98% or higher purity with modifying inclusions to provide increase in effective hardness and resistance to abrasion and plastic flow of the copper, and thus provide wear-resistant surfaces without necessity for liquid cooling. At the same time there is minimizing of scoring and plasticizing of the copper metal and its mating surface, while obtaining and retaining the high heat conductivity of the copper. The metal-particle material inclusion is such as to avoid substantial alloying which might reduce the heat conducting properties of the copper.

The use of copper tubing having reinforcing particle inclusion therein is also desirable in the electrical field where high heat and electrical conductivity with improved wear is desired for the mating parts such as in commutators and other rotating electrical parts. In such instances the substrates may be ferrous metal, aluminum, copper or ceramics.

Tubes of ferrous material such as for example austenitic steel containing hardening particles such as tungsten carbide, or reinforcing particles such as alumina, zirconia, mullite or the like may be employed for providing metallic substrates such as shafts or other surfaces with tough, wear-resistant qualities. On the other hand, the inclusion in the various tubes can be of materials such as particles of copper, lead and the like to improve machining properties.

Composite wire wherein the tube component is of aluminum may be employed in the production of bearings, friction mating members and the like. Aluminum per se is notorious for galling, but in accordance with the present invention there can be readily included therein a relatively hard reinforcing particle material as aforesaid, to render aluminum suitable for friction material overlays and used in brakes, clutches and the like. Other instances where use of aluminum composites of the present invention are feasible is in bearings and bearing surfaces where the inclusion is a lubricant material such as graphite, making it suitable for such uses as cylinder liners and the like, making use of sprayed aluminum feasible without sizing.

Although in general it is preferred to use the tube material of substantially pure character and to prevent alloying thereof with the contained modifying filler particle material, in some instances tubes composed of alloyed metal may be employed in the production of bearings of improved properties. Thus, tubes of brass or bronze such as phosphor bronze, yellow brass, Muntz metal and the like alloys, may be effectively employed for the tube component of the composite flame spraying wire of the present invention incorporating therein lubricating particle filler materials such as graphite, molybdenum disulphide, Babbitt metal, and the like. The manufacture of such bearings has in the past been limited to expensive and complicated sintering processes employing sintering technology and has precluded the use of many lubricating materials such as those aforesaid.

The composite flame spraying wire of the present invention in particularly adapted to facilitate the production of bearing surfaces of the aforesaid character and other metallic overlays wherein the inclusions are of lower melting character than the tube or are unstable compounds at the 5000-6000° F. temperatures generated by the oxy-acetylene or other chemical flame of the spray gun, in that firstly the fillers are protected by the metallic sheath, and secondly by the material in which the fillers are suspended and which provides protective atmospheres by disintegration or dissipation by evaporation of the aforesaid suspending media. Moreover, of course control is had by varying the inside and outside diameters of the tube, the mesh size particles of the fillers and their quantity.

Thus in flame spraying, the metallic tube melts first and is atomized and hurled at the target piece or substrate along with the filler matreial which has been protected from the heat by both the outer shield of the metal tube and the embracing suspending medium for the particles.

The method of the present invention thus also permits the inclusion of metals which might normally alloy with th tube metal but because of the short time that the filler material, even when it is metal, is exposed to the flame, little or no alloying will take place.

As previously indicated a characterizing feature of the present invention resides in suspending the inorganic modifying filler particle material in a suspending medium which is of aqueous or organic character or mixed character and which is readily disintegrable under conditions of flame spraying so that the particles while partially shielded are readily released under the influence of the flame and propelling gas. The employment of the suspending medium permits control of the amount of additive material in a precise manner and provides a means of keeping fillers of different gravity in uniform suspension and distribution within the hollow metal outer tube.

In one specific embodiment the suspension should be pumpable so that the metal tube may be filled by projecting the pumpable suspension into the tube by pressure or suction or a combination of both, and as an aid to this the tube may be first flushed with a conventional wetting agent, or in the alternative the pumpable suspension may include the wetting agent such as for example ethylene glycol or Aerosol OT (dioctyl sodium sulfosuccinate).

Thus, for example, as an aid to incorporating the particle material a slurry is first formed with water containing colloidal alumina which sets up to a thixotropic condition on standing. After filling a suitable length of tube the ends are sealed up for storage and use.

Other aids in forming thickened stable suspensions of modifying particle materials may be cereal starch pastes, and thickening agents such as aqueous sodium carboxy methyl cellulose, bentonite, vegetable gums and factices. Others are organic materials such as oils and greases having viscosities which may approach that of petroleum jelly. Other organic suspending media can be aqueous dispersions or solvent solutions of plastics such as of vinyl resins, butadiene-styrene or like synthetic rubbers, and the like. Other types of organic suspending agents which may be employed are polyurethane and the like resins which may be foamed in place. Others are heat-hardenable resins such as viscous epoxy resins, aqueous phenol-formaldehyde resins and the like. These may be of a type which harden on standing or hardening may be accelerated by heating of the tube after the thermosetting resins are injected into the tube with their suspension of fillers.

Another type of suitable suspending agent which is not of the fluid or pumpable character are extruded mixes of rubber compositions containing the filler particles such as may be made in a Banbury or dough mixer, or the like and extruded through a suitable nozzle to self-sustaining form and to a diameter which can be readily threaded into the metal tube. When a mix of this or similar nature is hardened the metal tube may be formed of a sheet of metal and rolled or shaped about the filler.

When the suspending medium contains aqueous materials the water of course readily vaporizes during the flame spraying and provides a cooling atmosphere to limit destruction or alloying during the small increment of time the composite wire is subjected to the flame of the spray gun, and the same applies to the degradation products of the organics which in general additionally provide a protective non-oxidizing atmosphere and which readily carbonize. These rapidly free the compound or suspended modifying particle materials from suspension within the tube which of course is simultaneously subjected to atomization by the heat and propelling gases of the spray gun.

In all instances due to the flame spraying technique employed and the protection and rapid cooling of the particle material on leaving the gun in its passage to the substrate, no appreciable alloying is encountered and the fidelity of both the metal and the contained particle material is substantially retained.

In the accompanying drawings,

FIG. 1 diagrammatically indicates the spraying of a composite flame spraying wire of the present invention onto a flat substrate.

FIG. 2 is a longitudinal section of the composite flame spraying wire of the present invention.

FIG. 3 is a relatively enlarged view of the end of the nozzle of the flame spraying gun and of the composite wire as it issues therefrom as it is atomized, illustrating the enveloping conical effect of the outer cone of atomized metal and the inwardly disposed issuing cone of disseminated modifying particle material inclusion.

Thus referring to the drawings, the flame spraying wire 10 of the present invention comprises a metal tube or jacket 11 which can have an outside diameter of ⅛ inch to fit a standard wire flame spraying gun and suitably has an inside diameter of about 3/16 inch filled with a suspension of adjuvant or modifying particle material 12. Spraying of the composite wire 10 which desirably is flexible and fed from a conventional reel, not shown, is diagrammatically shown in FIG. 1 by means of the nozzle generally indicated as 13 having an air cap 14 together with passages therein comprising the compressed air passage 15 between the air cap 14 and the nozzle part 16. The combustion gas 18 passes between the nozzle parts 16 and 17 which provides an axial orifice for supporting the composite wire 10 while being fed through the nozzle. The sources of combustion gases and compressible propelling gas, i.e. the air supply being part of conventional metallizing guns is well understood and therefore not shown.

The resulting atomized spray 19 initially comprising an outer cone 20 and an inner cone 21 impinges at a right angle to the substrate 22 with high velocity and efficiency and with a better and truer mix than when separately spraying particle material and metal rod at angles converging to the work. In the latter practice one spray tends to blow the other away, whereas in the present method and with our novel composite wire, an enveloping trap-like spray of metal envelops the contained particle material to provide a high and stable yield and a substantially homogeneous mixed surface coating 23, as distinguished from layers of the components. Although the substrate 22 is shown to be flat it will be understood that it may be curvilinear for parts such as bearings, brake shoes, brake drums, shafts and other curvilinear or cylindrical surfaces, and with such curvilinear surfaces it will be understood that the spray is to be in a general radial direction to the work, such radial projection being generally comprehended by the terminology in the following claims and being in a direction normal to the work.

It will be understood of course that when spraying metallic substrates, they are conventionally pre-heated before spraying, suitably cleaned or abraded and if desired sprayed with an underlay or flash of a spray metal or alloy, such as for example low melting silver solder or silver brazing alloy, as an aid in anchoring the deposit. The resulting sprayed or overlaid substrate may be suitably heated to from about 1200 to about 1400° F. to improve both the bond and strength of the composite as is well understood in the flame spraying or metallizing art.

As an example of the practice of the present invention and for the purpose of illustration and not limitation, a substantially pure copper tubing of the dimensions aforesaid was filled with an aqueous slurry of colloidal alumina and 600 mesh crystalline aluminum oxide which had set up to a thixotropic character. The ultimate analysis of the tube as fed into the gun was 93% copper, 2% aluminum oxide, 4% 600 mesh alumina, and 1% by weight of water (equivalent respectively to 80.2%, 4.1%, 8.0%, and 7.7% by volume). This was sprayed from a conventional flame spray gun using an oxy-acetylene flame onto an aluminum brake drum. An analysis of the deposit of metal showed 95% copper and 5% aluminum by weight. The alumina particle material was extremely well dispersed as observed under a microscope, the copper was extremely dense and on the finished machined surface the alumina was almost invisible.

A typical formula of a filler particle material suspension is one compound of 4 parts by weight of colloidal alumina (Du Pont Baymal), 21 parts of 600 mesh Alundum, and 75 parts or less of water. The Alundum and colloidal alumina are pre-mixed dry and then added to the water while agitating. The mixture is allowed to age for 12 hours and then re-agitated. The product is a paint-like thixotropic liquid and can readily be pumped into a metal tube.

In lieu of the Alundum equivalent mesh grades of flat refractory or abrasive materials such as electrically fused zirconia, mullite, emery, silica and the like may be employed. In lieu of the colloidal alumina, sodium carboxy methyl cellulose, bentonite, china clay, and the like thickening agents may be employed as the suspending media as previously described.

Thus, for example, a lubricant mix suspension may be formed by weight of 25 parts graphite, 74 parts water, 0.5 part sodium carboxy methylcellulose and 0.5 part of Aerosol OT. These are mixed and permitted to stand for 12 hours and then re-agitated to result in a paint-like liquid. A mix similar to the foregoing but employing 50 parts of water and 50 parts by weight of graphite results in a suspension having a thixotropic-like character.

Another suitable mix is one containing parts by weight of the following: silver powder 6.0, 200 mesh tungsten carbide powder 54.0, sodium carboxy methylcellulose 1.0, and water 39.0. The usual length of tubing is approximately 50 feet and the outside diameter suitable for the flame spray gun is ⅛ inch. The wall thickness of the tube can be as desired and suitable can be on the order of from about .010 to about .040.

An abrasive resisting steel overlay for materials subject to high unit pressure and sliding such as curved railway track and for the fingers of power shovels subjected to shock and heavy abrasion is a tube composed of an austenitic manganese alloy composed of 1.1% carbon, 12% manganese, 0.2% silicon and the balance iron by weight, having an outside diameter of ⅛ inch and an inside diameter of 1/16 inch. This is filled with a thixotropic mix containing 600 mesh Alundum and an aqueous dispersion colloidal alumina to provide an ultimate analysis of 90% austenitic manganese steel and 10% Alundum. When sprayed onto a substrate as above, after cleaning and flash coating with molybdenum, a sprayed deposit of about 94% steel and 6% by weight of Alundum is obtained, the incorporated particles of Alundum contributing to wear resistance and reduction of plastic flow.

It will be apparent from the foregoing that by means of the novel composite wire hereinabove described one can at one time from a single source and in a novel and efficient manner coat a substrate with a matrix of metal of desired character which may be substantially pure or a predetermined alloy, and while substantially retaining the character of the aforesaid metal or alloy, incorporate therein a substantially discontinuous filler or inclusion which can be one which is of relatively hard and high melting point whereby the effective hardness, resistance to abrasion and plastic flow of the metal is increased providing wear-resistant surfaces useful, for example in both the friction elements and mating members of friction couples such as brakes and clutches, electrical parts or other wearing surfaces. Again the discontinuous filler or inclusion may be of a lubricating nature thus to provide bearing surfaces of enhanced character or permit use of lubricant metal such as aluminum for bearings of novel character. Again, various materials such as steel may have incorporated therewith particle materials which enhance machinability and provide increased hardness and resistance to wear such as in the case of shafts and the like.

We claim:

1. The method of coating a substrate with a metal matrix and an inorganic particle inclusion which comprises flame spraying said substrate in a direction substantially normal thereto with composite flame spraying wire composed of a metallic tube and discrete particles of ceramic oxide and carbide modifying material dispersed in a thixotropic suspending medium substantially filling the confines of said tube, said suspending medium being disintegrable under flame spraying conditions and concomitantly providing a barrier against substantial disintegration of said inorganic material or substantial alloying thereof with the tube metal.

2. The method of coating a substrate with a metal matrix and an inorganic particle inclusion which comprises flame spraying said substrate in a direction substantially normal thereto with composite flame spraying wire composed of a metallic tube and discrete particles of ceramic oxide and carbide modifying material dispersed in a thixotropic suspending medium substantially filling the confines of said tube, said suspending medium being disintegrable under flame spraying conditions and concomitantly providing a barrier against substantial disintegration of said inorganic material or substantial alloying thereof with the tube metal.

3. A composite flame spraying wire composed of a metallic tube and discrete particles of ceramic oxide and carbide modifying material dispersed in a [liquid] *thixotropic* suspending medium substantially filling the confines of said tube, said suspending medium being disintegrable under flame spraying conditions and concomitantly providing a barrier against substantial disintegration of said inorganic material or substantial alloying thereof with the tube metal.

4. Composite flame spraying wire composed of a metallic tube and discrete particles of ceramic oxide and carbide modifying material dispersed in a liquid suspending medium substantially filling the confines of said tube, said suspending medium being disintegrable under flame spraying conditions and concomitantly providing a barrier against substantial disintegration of said inorganic material or substantially alloying thereof with the tube metal.

5. The composite of claim 4 wherein the suspending medium comprises aqueous material.

6. The composite of claim 4 wherein the suspending medium with its inorganic particle content is pumpable.

7. The composite of claim 4 which includes in addition inorganic lubricating particle material.

8. The composite of claim 4 wherein said inorganic particles comprise particles of higher melting point and greater hardness than said tube together with finely divided graphite.

References Cited

The following references, cited by the Examiner, are of record in the patented file of this patent or the original patent.

UNITED STATES PATENTS

| | | | |
|---|---|---|---|
| 2,219,462 | 10/1940 | Wissler | 219—145 |
| 2,231,247 | 2/1941 | Bleakley | 117—105.5 X |
| 2,570,649 | 10/1951 | Davidoff | 117—105 |
| 2,613,304 | 10/1952 | Colinet | 219—145 X |
| 2,904,449 | 9/1959 | Bradstreet | 117—105.2 |
| 3,055,769 | 9/1962 | Herron | 117—46 |
| 3,175,074 | 3/1965 | Culbertson | 219—146 |
| 3,254,970 | 6/1966 | Dittrich et al. | 29—191 X |

ALFRED L. LEAVITT, Primary Examiner

A. GOLIAN, Assistant Examiner

U.S. Cl. X.R.

117—105.2, 131; 29—191.2, 191.6